(12) United States Patent
Kawahata

(10) Patent No.: US 12,706,390 B2
(45) Date of Patent: Aug. 11, 2026

(54) MICRO LENS ARRAY ANTENNA AND RADAR DEVICE AND VEHICLE HAVING MICRO LENS ARRAY ANTENNA

(71) Applicant: Murata Manufacturing Co., Ltd., Nagaokakyo (JP)

(72) Inventor: Kazunari Kawahata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 286 days.

(21) Appl. No.: 18/401,734

(22) Filed: Jan. 2, 2024

(65) Prior Publication Data

US 2024/0186713 A1 Jun. 6, 2024

Related U.S. Application Data

(63) Continuation of application No. PCT/JP2022/023384, filed on Jun. 9, 2022.

(30) Foreign Application Priority Data

Jul. 2, 2021 (JP) ................................ 2021-111138

(51) Int. Cl.
*H01Q 15/08* (2006.01)
*G01S 7/03* (2006.01)
(Continued)

(52) U.S. Cl.
CPC .............. *H01Q 15/08* (2013.01); *G01S 7/03* (2013.01); *G01S 13/931* (2013.01); *H01Q 19/06* (2013.01); *H01Q 21/065* (2013.01)

(58) Field of Classification Search
CPC ....... G01S 13/931; G01S 7/03; H01Q 1/3233; H01Q 1/52; H01Q 15/08; H01Q 19/06;
(Continued)

(56) References Cited

U.S. PATENT DOCUMENTS 3,386,099 A * 5/1968 Walter .................. H01Q 15/04 343/893
5,781,163 A * 7/1998 Ricardi ................. H01Q 15/08 343/754

(Continued)

FOREIGN PATENT DOCUMENTS

DE 102007034329 A1 * 1/2009 ............ H01Q 21/08
EP 3518342 A1 7/2019

(Continued)

OTHER PUBLICATIONS

Office Action issued Feb. 4, 2025 in Japanese Patent Application No. 2023-531753.

(Continued)

*Primary Examiner* — Peter M Bythrow
(74) *Attorney, Agent, or Firm* — XSENSUS LLP

(57) ABSTRACT

A micro lens array that includes a planar array antenna including a plurality of planar antennas formed on a substrate, a plurality of dielectric lenses each provided above each of the plurality of planar antennas, and a plurality of dielectric plates each provided on part of the substrate, the part being provided between two adjacent dielectric lenses of the plurality of dielectric lenses.

14 Claims, 5 Drawing Sheets

(51) Int. Cl.
*G01S 13/931* (2020.01)
*H01Q 19/06* (2006.01)
*H01Q 21/06* (2006.01)

(58) Field of Classification Search
CPC .. H01Q 19/062; H01Q 21/061; H01Q 21/065; H01Q 25/007
See application file for complete search history.

(56) References Cited

U.S. PATENT DOCUMENTS

| | | | | |
|---|---|---|---|---|
| 6,590,544 | B1 * | 7/2003 | Filipovic | H01Q 19/062 343/753 |
| 7,898,480 | B2 * | 3/2011 | Ebling | H01Q 3/30 343/810 |
| 10,693,210 | B2 * | 6/2020 | Chattopadhyay | H01Q 15/08 |
| 11,387,547 | B2 * | 7/2022 | Nagaishi | H01Q 25/00 |
| 11,967,776 | B2 * | 4/2024 | Scarborough | H01Q 3/14 |
| 2002/0067314 | A1 * | 6/2002 | Takimoto | H01Q 3/14 343/711 |
| 2007/0195004 | A1 * | 8/2007 | Rebeiz | H01Q 1/3233 343/876 |
| 2010/0328779 | A1 * | 12/2010 | Llombart Juan | H01Q 19/09 359/619 |
| 2012/0013517 | A1 * | 1/2012 | Lee | H01Q 13/22 343/785 |
| 2014/0144009 | A1 * | 5/2014 | Chattopadhyay | H01Q 3/34 355/77 |
| 2018/0269576 | A1 * | 9/2018 | Scarborough | H01Q 25/007 |
| 2020/0319293 | A1 * | 10/2020 | Kuriyama | G01S 13/931 |
| 2020/0350681 | A1 * | 11/2020 | Scarborough | H01Q 1/42 |
| 2021/0143533 | A1 * | 5/2021 | Nagaishi | H01Q 1/422 |

FOREIGN PATENT DOCUMENTS

| | | | | |
|---|---|---|---|---|
| JP | H10-126146 | A | 5/1998 | |
| JP | 2000-209022 | A | 7/2000 | |
| JP | 2003-332835 | A | 11/2003 | |
| JP | 2014-155134 | A | 8/2014 | |
| JP | 2016-072806 | A | 5/2016 | |
| JP | 2018-157541 | A | 10/2018 | |
| JP | 2018-207301 | A | 12/2018 | |
| JP | 2019-054546 | A | 4/2019 | |
| JP | WO2020110696 | A1 * | 9/2021 | H01Q 19/062 |
| WO | 2020110696 | A1 | 6/2020 | |
| WO | 2021/070462 | A1 | 4/2021 | |

OTHER PUBLICATIONS

International Search Report and Written Opinion mailed on Aug. 16, 2022, received for PCT Application PCT/JP2022/023384, filed on Jun. 9, 2022, 9 pages including English Translation.

* cited by examiner (a)

(b)

(c)

MICRO LENS ARRAY ANTENNA AND RADAR DEVICE AND VEHICLE HAVING MICRO LENS ARRAY ANTENNA

CROSS-REFERENCE TO RELATED APPLICATIONS

This application is a continuation of international application no. PCT/JP2022/023384, filed Jun. 9, 2022, and which claims priority to Japanese application no. JP 2021-111138, filed Jul. 2, 2021, the entire contents of each of which being incorporated herein by reference.

TECHNICAL FIELD

The present disclosure relates to a micro lens array antenna including dielectric lenses above a planar array antenna and to a radar device and a vehicle that include the micro lens array antenna.

BACKGROUND ART

As this type of array antenna, for example, a conventionally known micro lens array antenna is disclosed in Non-Patent Document 1. In this array antenna, as illustrated in FIG. 2 of this document, horn antennas are arranged above a microstrip antenna to form an array, and dielectric lenses are attached to the opening portions of the horn antennas.

CITATION LIST

Non-Patent Document

Non-Patent Document 1: "Horn and Lens Antenna with Low Height and Low Antenna Coupling for Compact Automotive 77-GHz Long-Range Rader" IEICE TRANS. ELECTRON, VOL. E103-C, NO. 10 Oct. 2020 (Hitachi, Ltd.)

SUMMARY

Technical Problems

However, in the conventional array antenna disclosed in Non-Patent Document 1, radio waves emitted by the antenna leak through the gaps between the outer peripheral edge portions of the dielectric lens and the inner peripheral edge portions of the opening ends of the horns. This leakage of radio waves serves as a wave source and affects adjacent antennas and degrades the sidelobe characteristics of the horn antennas. In addition, in the conventional array antenna described above, the horn height H relative to the aperture diameter D cannot be smaller for the phase matching on the aperture surface. In addition, when an attempt is made to reduce the height H, since portions of dielectric lens opposite to the antennas have a convex shape, the sidelobe characteristics and the antenna gain degrade because radio waves are blocked from propagating to adjacent dielectric lenses.

Solution to Problem

The present invention addresses the problems described by providing a micro lens array antenna including a planar array antenna formed on a substrate, dielectric lenses provided above planar antennas that constitute the planar array antenna, and dielectric plates provided on portions of the substrate that are provided between two of the dielectric lenses.

In the structure, of the radio waves emitted from each of the planar antennas, the radio wave emitted at a low elevation angle toward a dielectric lens provided above an adjacent planar antenna is reflected by the dielectric plate provided on a portion of the substrate between two of the dielectric lenses. Accordingly, the radio wave emitted at a low elevation angle is blocked by the dielectric plate from propagating to the dielectric lens provided above the adjacent planar antenna. Accordingly, the radio wave emitted at a low elevation angle toward the outside of the emission range of the dielectric lens above the planar antenna is suppressed by a portion of the dielectric lens opposite to the planar antenna being formed in a convex shape and the focal length of the dielectric lenses being reduced to suppress the height of the micro lens array antenna. As a result, the antenna gain is less likely to be reduced and the sidelobe characteristics are less likely to degrade in the planar antennas due to effects of the radio waves emitted from adjacent planar antennas by portions of the dielectric lenses opposite to the planar antenna being formed in a convex shape and the focal length of the dielectric lenses being reduced to suppress the height of the micro lens array antenna.

In addition, the present disclosure provides a radar device including the micro lens array antenna described above and a vehicle having the radar device.

Advantageous Effects

According to the present disclosure, it is possible to provide a micro lens array antenna in which the antenna gain is less likely to be reduced and the sidelobe characteristics are less likely to degrade and to provide a radar device and a vehicle that include the micro lens array antenna.

DESCRIPTION OF EMBODIMENTS

Next, embodiments for realizing a micro lens array antenna according to the present disclosure and a radar device and a vehicle that include the micro lens array antenna are described.

Figure 1:
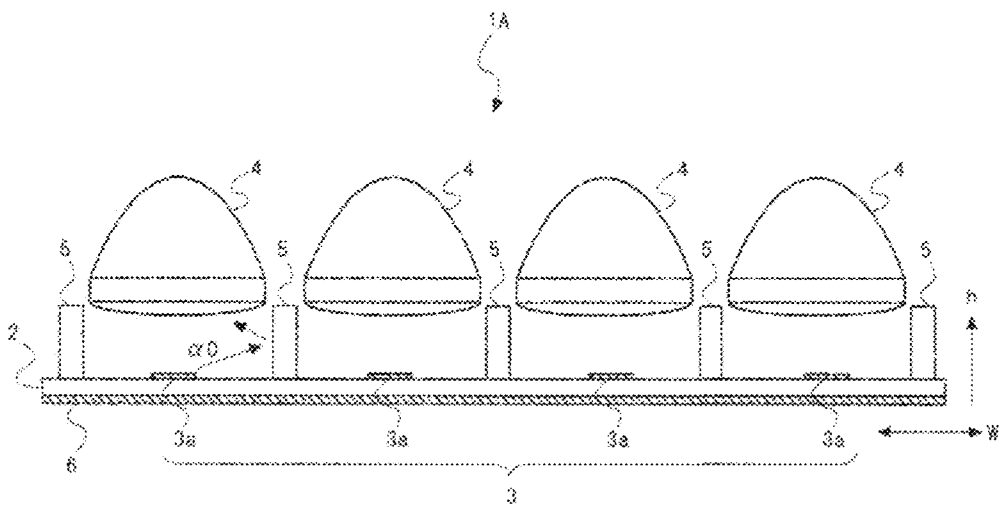
FIG. 1 is a side view of a micro lens array antenna according to a first embodiment of the present disclosure.

FIG. 1 is a side view of a micro lens array antenna 1A according to a first embodiment of the present disclosure.

The micro lens array antenna 1A includes a planar array antenna 3 formed on a substrate 2, dielectric lenses 4 provided above the planar array antenna 3, and dielectric plates 5 vertically provided on portions of the substrate 2 that are provided between two of the dielectric lenses 4. In the planar array antenna 3, the patch antennas 3*a* that constitute the planar antenna are formed at regular intervals in one direction on the surface of the substrate 2. A ground pattern 6 that provides a reference potential for the patch antennas 3*a* is formed on the back surface of the substrate 2. The dielectric lenses 4 are provided on the upper side of the patch antennas 3*a* that constitute the planar array antenna 3, and the patch antennas 3*a* are located at the focal points of the corresponding dielectric lenses 4 provided on the upper side of the patch antennas 3*a*. The upper side here corresponds to the direction in which the patch antennas 3*a* emit radio waves.

In the embodiment, a dielectric lens 4 side opposite to the patch antenna 3*a* is formed in a bulging spindle shape to focus the radio waves emitted from the patch antennas 3*a*. The dielectric lens 4 side opposite to the patch antenna 3*a* has a bulging convex shape to control a radio wave α0 emitted at a low elevation angle by reducing the focal length. The directivity of the micro lens array antenna 1A is controlled by combining the electric power of the radio waves received by the patch antennas 3*a*.

It should be noted that the dielectric plate 5 in this specification ranges from a thin dielectric film to a thick dielectric block. When the frequency of a radio wave emitted from the patch antenna 3*a* is increased, the thickness of the dielectric plate 5 generally decreases and becomes film-like. When the frequency decreases, the thickness of the dielectric plate 5 generally increases and becomes block-like.

In the micro lens array antenna 1A according to the embodiment as described above, of the radio waves emitted from each of the patch antennas 3*a*, the radio wave α0 emitted at a low elevation angle toward the dielectric lens 4 provided above the adjacent patch antenna 3*a* is reflected by the dielectric plate 5 provided on a portion of the substrate 2 between two of the dielectric lenses 4 as described in the drawing. Accordingly, the radio wave α0 emitted at a low elevation angle is blocked by the dielectric plate 5 from propagating to the dielectric lens 4 provided above the adjacent patch antenna 3*a*.

Accordingly, the radio wave α0 emitted at a low elevation angle toward the outside of the emission range of the dielectric lens 4 above the patch antenna 3*a* is suppressed by a portion of the dielectric lens 4 opposite to the patch antenna 3*a* being formed in a convex shape that bulges outward and by the focal length of the dielectric lens 4 being reduced to suppress the dimension in a height direction h of the micro lens array antenna 1A.

Furthermore, the antenna gain is less likely to be reduced and the sidelobe characteristics are less likely to degrade in the patch antennas 3*a* due to effects of the radio waves α0 emitted from adjacent patch antennas 3*a* by the distance between the dielectric lenses 4 being reduced to reduce the dimension in an extension direction w of the micro lens array antenna 1A.

Figure 2:
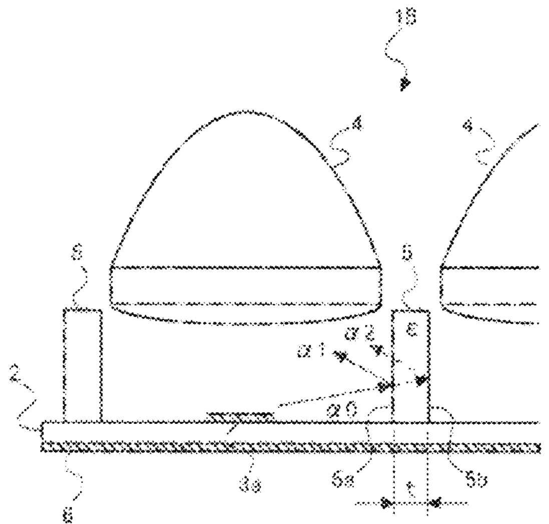
FIG. 2 is a side view of part of a micro lens array antenna according to a second embodiment of the present disclosure.

FIG. 2 is a side view of part of a micro lens array antenna 1B according to a second embodiment of the present disclosure. In the drawing, the same or corresponding components as in FIG. 1 are given the same reference numerals, and description thereof is omitted.

The micro lens array antenna 1B according to the second embodiment differs from the micro lens array antenna 1A according to the first embodiment in that a thickness t and a dielectric constant & of the dielectric plates 5 are as follows. That is, the dielectric plates 5 of the micro lens array antenna 1B have the thickness t and the dielectric constant & at which the phase of the second reflected radio wave 2 of the radio wave α0 shifts by a predetermined phase from the phase of the first reflected radio wave α1 of the radio wave α0 shifts. The first reflected radio wave α1 is the radio wave α0 having been emitted from the patch antenna 3*a* and having been reflected by one side surface 5*a* of the dielectric plate 5 that faces the patch antenna 3*a*. The second reflected radio wave α2 is the radio wave α0 having passed through the one side surface 5*a*, having propagated through the dielectric plate 5, having been reflected by another side surface 5*b* of the dielectric plate 5 opposite to the one side surface 5*a*, and having appeared in the space close to the one side surface 5*a*.

In the micro lens array antenna 1B according to the second embodiment as described above, the phase of the second reflected radio wave α2, that is the radio wave α0 having been reflected by the other side surface 5*b* of the dielectric plate 5 and having appeared in the space close to the one side surface 5*a* shifts by a predetermined phase from the phase of the first reflected radio wave α1, that is the radio wave α0 having been emitted from the patch antenna 3*a* and having been reflected by the one side surface 5*a* of the dielectric plate 5, and accordingly, the strength of a combined wave of the first reflected radio wave α1 and the second reflected radio wave α2 shifting from the first reflected radio wave α1 by a predetermined phase is reduced. In particular, when the phase of the second reflected radio wave α2 becomes opposite to the phase of the first reflected radio wave α1, the strength of the combined wave of the first reflected radio wave α1 and the second reflected radio wave α2 becomes minimum.

To cause the phase of the second reflected radio wave α2 to be opposite to the phase of the first reflected radio wave α1, when the incident angle θ of the radio wave α0 incident on the one side surface 5*a* is 0° for simplicity of description, the thickness t of the dielectric plate 5 is expressed by formula (1) below, where AO is the wavelength of the radio wave α0 that propagates through the space, λg is the wavelength of the radio wave α0 that propagates through the dielectric plate 5, and ε is the dielectric constant of the dielectric plate 5.

$$t \approx \lambda g/4 = \lambda 0/(4 \cdot \varepsilon^{1/2}) \quad (1)$$

When the dielectric plate 5 has the thickness t expressed by formula (1), the sum of a distance 1*a* traveled by the radio wave α0 from the one side surface 5*a* to the other side surface 5*b* through the dielectric plate 5 and the distance 1*b* traveled by the second reflected radio wave α2 from the other side surface 5*b* to the one side surface 5*a* in the dielectric plate 5 after being reflected by the other side surface 5*b* is λg/2 as illustrated in formula (2) below, and the phase of the second reflected radio wave α2 that appears on the one side surface 5*a* side is opposite to the phase of the first reflected radio wave α1.

$$La + 1b = \lambda g/4 + \lambda g/4 = \lambda g/2 \quad (2)$$

Accordingly, adjusting the thickness t and the dielectric constant ε of the dielectric plate 5 can reduce the effect of the first reflected radio wave α1 on the dielectric lens 4, which is located above the patch antenna 3*a* that produces the first reflected radio wave α1. In addition, adjusting the amount of the phase shift between the first reflected radio wave α1 and the second reflected radio wave α2 can control the amount of reflection of the component in a desired direction of the first reflected radio wave α1. Accordingly, it is possible to effectively reduce the first reflected radio wave α1, which is a component in the reflection direction that has a large effect on the dielectric lens 4 provided above the patch antenna 3*a* that produces the first reflected radio wave α1. Therefore, the antenna gain of the patch antenna 3*a* can be effectively prevented from decreasing FIG. 3 (*a*) is a plan view, FIG. 3 (*b*) is a side sectional view taken along line A-A, and FIG. 3 (*c*) is a side sectional view taken along line B-B of a micro lens array antenna 1C according to a third embodiment of the present disclosure. In the drawings, the same or corresponding components as in FIG. 1 are given the same reference numerals, and description thereof is omitted.

The micro lens array antenna 1C according to the third embodiment differs from the micro lens array antenna 1B according to the second embodiment in that the planar array antennas 3 are arranged adjacent to each other in a plurality of rows on the substrate 2, each of the dielectric lenses 4 of the planar array antennas 3 is formed in an elliptical shape having a major axis in the long-side direction of the substrate 2 orthogonal to the short-side direction of the substrate 2 in which the rows of the planar array antennas 3 are arranged in plan view of a surface of the substrate 2, and two or more patch antennas 3*a* are formed at a predetermined distance from focal points c of the dielectric lenses 4 on the substrate 2 around the focal points c in the direction of the major axis.

In the micro lens array antenna 1C according to the third embodiment as described above, the directivity of the micro lens array antenna 1C can be aligned with the long-side direction of the substrate 2 by switching the excitation of the plurality of patch antennas 3*a* offset from the focal points c of the dielectric lenses 4 in the long axis direction of the dielectric lens 4 on the substrate 2 or by changing the excitation phases of the patch antennas 3*a* and combining the phases. In addition, the directivity of the micro lens array antenna 1C can be aligned with the short-side direction of the substrate 2 by changing the excitation phases of the four patch antennas 3*a* that constitute each of the planar array antennas 3 arranged in the short-side direction of the substrate 2 and combining the directivities. Accordingly, the direction in which the radio wave reaches the micro lens array antenna 1C can be calculated in accordance with the radio wave received by the micro lens array antenna 1C.

Figure 4:
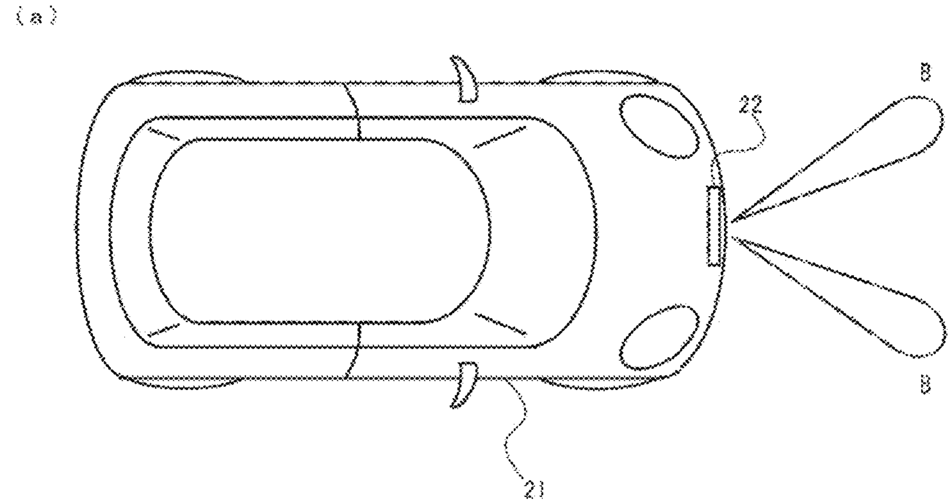
FIG. 4 illustrates a plan view, a side view, and a front view of a vehicle including a radar device including the micro lens array antenna illustrated in FIG. 3.
Figure 4:
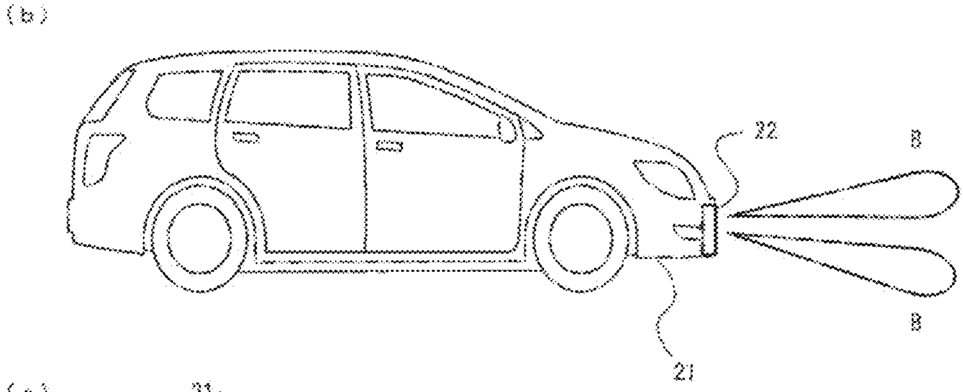
Figure 4:
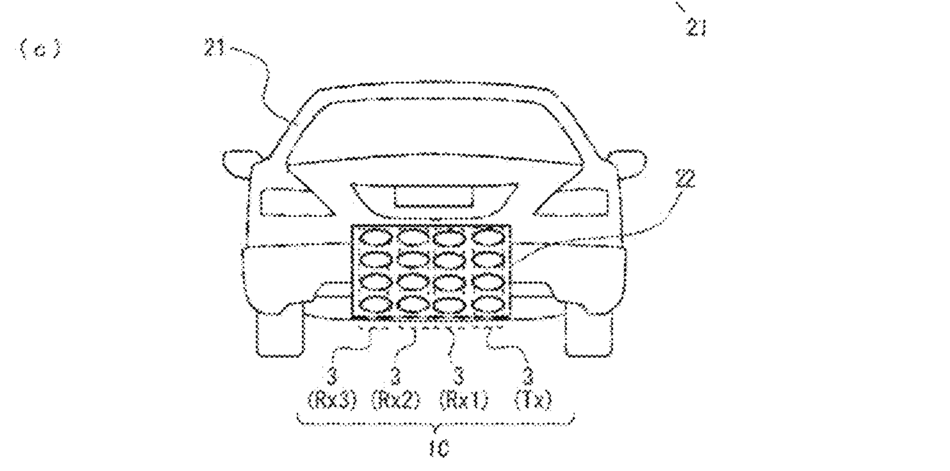

For example, FIG. 4 (*b*) illustrates a side view and FIG. 4 (*c*) illustrates a front view of a vehicle 21 for which a plan view is illustrated in FIG. 4 (*a*), and when the radar device 22 having a micro lens array antenna 1C is provided in a front portion of the vehicle 21, the height direction of the vehicle 21 is aligned with the short-side direction of the substrate 2 and the width direction of the vehicle 21 is aligned with the long-side direction of the substrate 2, and the radar device 22 has a directivity in the azimuth direction of the vehicle 21 and a directivity in the elevation direction of the vehicle 21. Accordingly, a beam B emitted from the radar device 22 can be controlled in the azimuth direction illustrated in FIG. 4 (*a*) and in the elevation direction illustrated in FIG. 4 (*b*). Therefore, the direction of the radio wave arriving in the azimuth direction and the elevation direction can be calculated in accordance with the radio wave received by the micro lens array antenna 1C.

At this time, as illustrated in FIG. 4 (*c*), the planar array antenna 3 in the rightmost column of the micro lens array antenna 1C is a transmission antenna Tx, and the planar array antennas 3 in the columns to the left of the transmission antenna Tx are reception antennas Rx1, Rx2, and Rx3. The direction of the radio wave that reaches the antenna is obtained by digital beamforming or the like in accordance with the phase difference of the radio waves received by the reception antennas Rx1, Rx2, and Rx3. Accordingly, the directivity of the micro lens array antenna 1C can tilt in the azimuth direction and the elevation direction of the vehicle 21.

Figure 3:
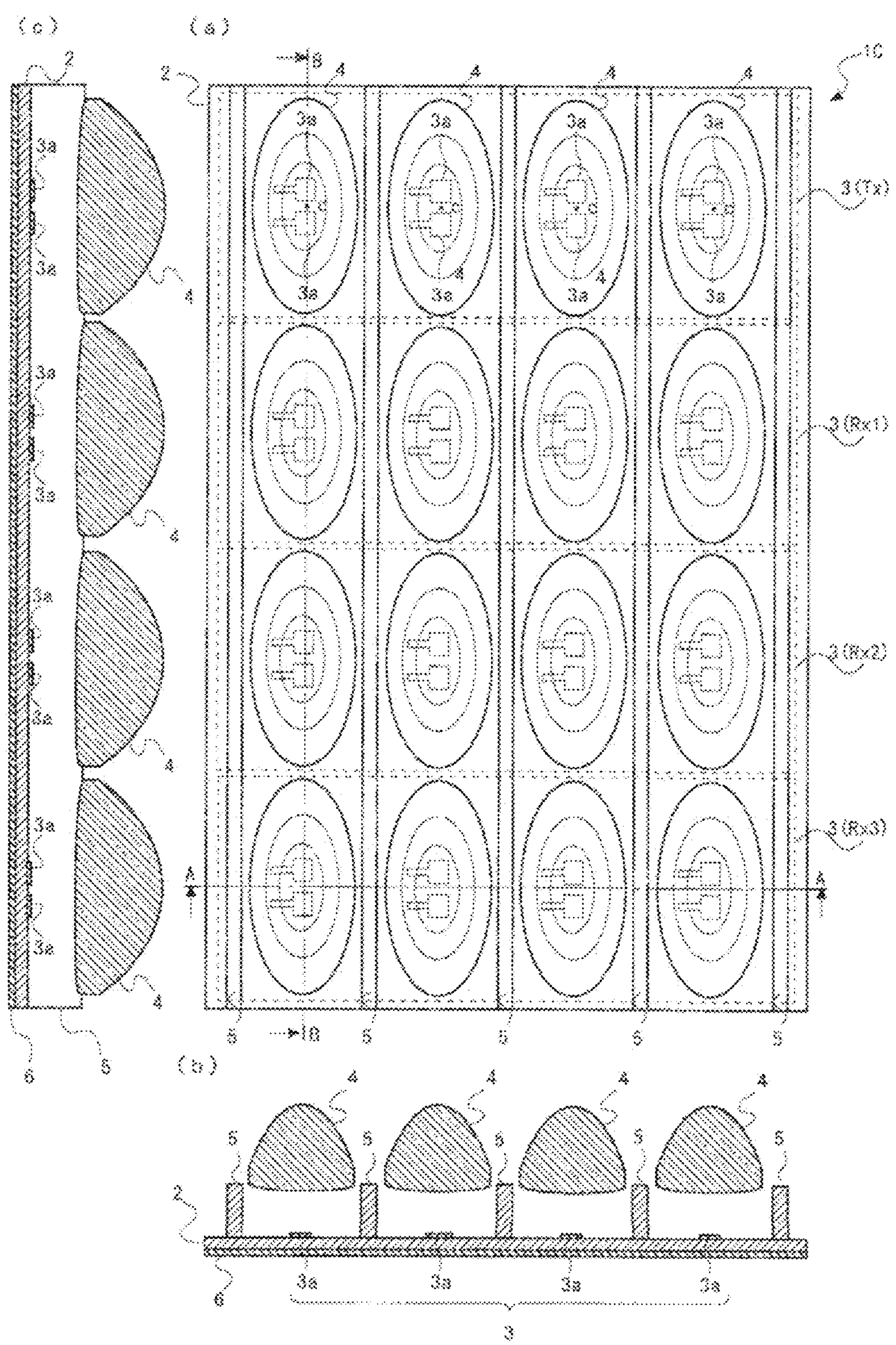
FIG. 3 illustrates a plan view and side sectional views of a micro lens array antenna according to a third embodiment of the present disclosure.
Figure 5:
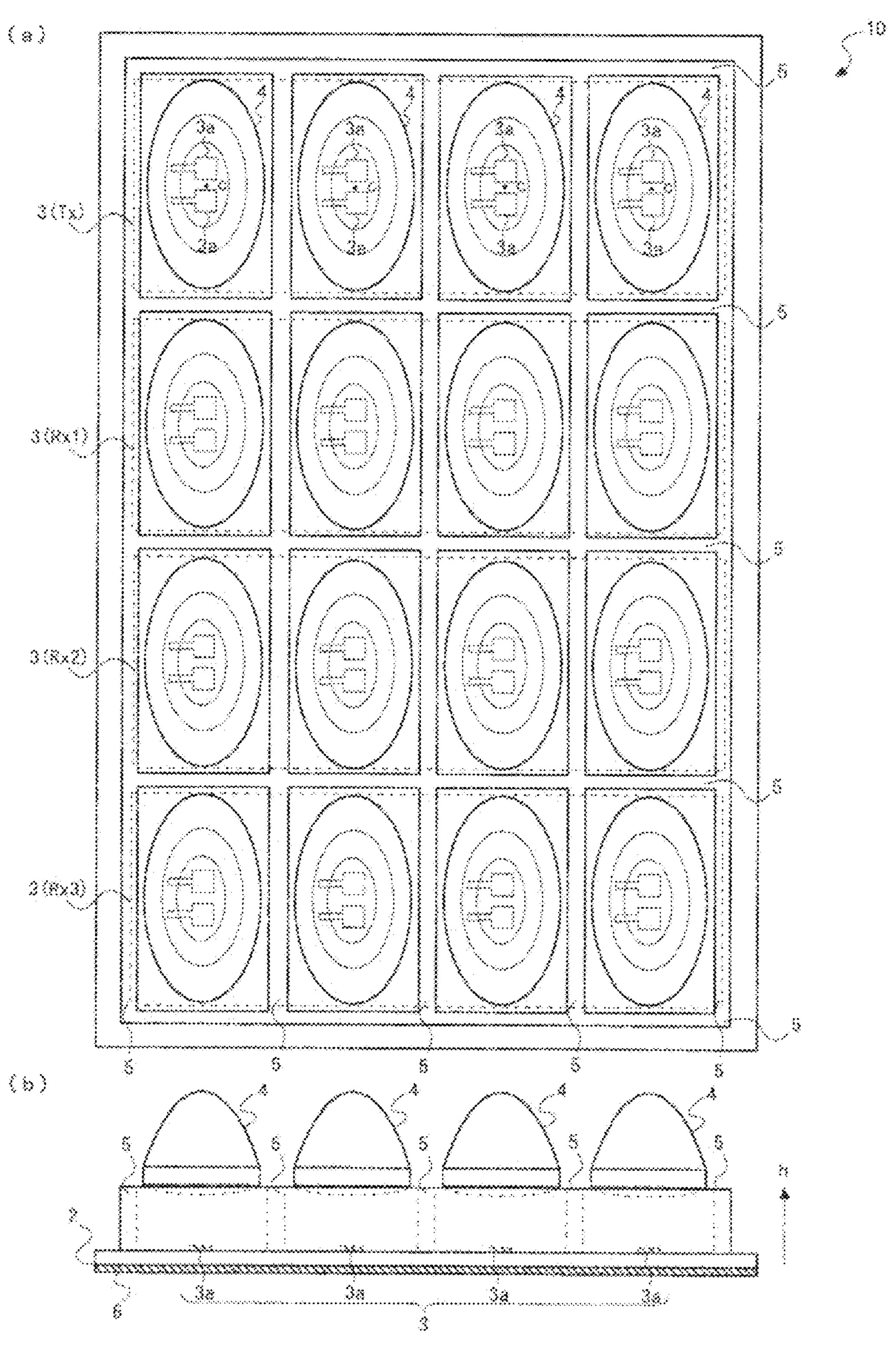
FIG. 5 illustrates a plan view and a side view of a micro lens array antenna according to a fourth embodiment of the present disclosure.

FIG. 5 (*a*) is a plan view of a micro lens array antenna 1D according to a fourth embodiment of the present disclosure, and FIG. 5 (*b*) is a side view thereof. In the drawings, the same or corresponding components as in FIGS. 1 and 3 are given the same reference numerals, and description thereof is omitted.

The micro lens array antenna 1D according to the fourth embodiment differs from the micro lens array antenna 1C according to the third embodiment in that the dielectric plate 5 is also vertically provided between adjacent patch antennas 3*a* that constitute the planar array antenna 3 in each column.

In the micro lens array antenna 1D according to the fourth embodiment as described above, between not only adjacent patch antennas 3*a* in the short-side direction of the substrate 2 but also adjacent patch antennas 3*a* in the long-side direction of the substrate 2, the radio wave α0 emitted at a low elevation angle toward the dielectric lens 4 provided above the adjacent patch antenna 3*a* in the long-side direction is reflected as illustrated in FIG. 1 by the dielectric plate 5 provided on a portion of the substrate 2 between two of the dielectric lenses 4 in each row. Accordingly, the radio wave α0 is blocked by the dielectric plate 5 from propagating to the dielectric lens 4 provided above the adjacent patch antenna 3*a* in the long-side direction.

Accordingly, in the micro lens array antenna 1D in which the planar array antennas 3 are formed in a plurality of rows, the dimension in the height direction h of the micro lens array antenna 1D can be suppressed by forming the dielectric lenses 4 in a convex shape. Furthermore, the antenna gain is less likely to be reduced and the sidelobe characteristics are less likely to degrade in the patch antennas 3*a* due to effects of the radio waves α0 emitted from adjacent patch antennas 3*a* as a result of the distance in the long-side direction being reduced between the dielectric lenses 4 of the substrate 2 to reduce the long-side dimension of the substrate 2.

Figure 6:
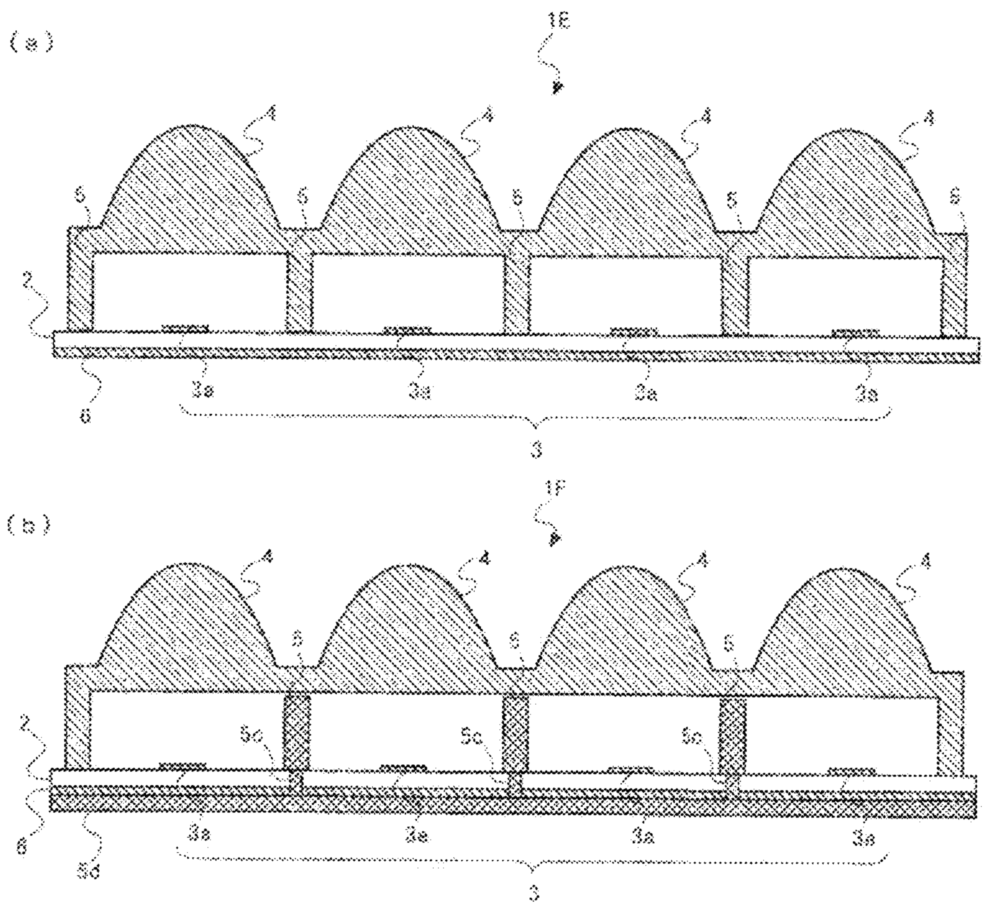
FIG. 6 (*a*) is a transverse sectional view of a micro lens array antenna according to a fifth embodiment of the present disclosure, and FIG. 6 (*b*) is a transverse sectional view of a micro lens array antenna according to a sixth embodiment of the present disclosure.

FIG. 6 (*a*) is a transverse sectional view of a micro lens array antenna 1E according to a fifth embodiment of the present disclosure. In FIG. 6, the same or corresponding components as in FIGS. 3 and 5 are given the same reference numerals, and description thereof is omitted.

The micro lens array antenna 1E according to the fifth embodiment differs from the micro lens array antenna 1C according to the third embodiment and the micro lens array antenna 1D according to the fourth embodiment in that the dielectric lenses 4 are formed integrally with the dielectric plates 5 and fixed onto the substrate 2.

In the micro lens array antenna 1E according to the fifth embodiment as described above, since the micro lens array antenna 1E can be assembled by fixing the dielectric lenses 4 and the dielectric plates 5 integrated with each other onto the substrate 2, the assemblability of the micro lens array antenna 1E is improved. In addition, since the dielectric lenses 4 and the dielectric plates 5 are molded integrally with each other, the cost of the components of the micro lens array antenna 1E can be reduced. Accordingly, it is possible to provide, at a low cost, the micro lens array antenna 1E in which the antenna gain is less likely to be reduced and the sidelobe characteristics are less likely to degrade. It should be noted that, in a micro lens array antenna 1A according to the first embodiment and a micro lens array antenna 1B according to the second embodiment as well, the dielectric lenses 4 and the dielectric plates 5 may be molded integrally with each other as in the micro lens array antenna 1E according to the fifth embodiment. In this structure, the same operation and effect as in the micro lens array antenna 1E according to the fifth embodiment are obtained.

FIG. 6B is a transverse sectional view of a micro lens array antenna 1F according to a sixth embodiment of the present disclosure in which only the dielectric lenses 4 are formed integrally with each other separately from the dielectric plates 5 provided between the patch antennas 3*a* when the dielectric constant of the dielectric lenses 4 cannot be identical to the dielectric constant of the dielectric plates 5. In this case, the dielectric plates 5 are supported by vias 5*c* that pass through the substrate 2 and are coupled to the dielectric plates 5, and the vias 5*c* are fixed to a dielectric layer 5*d* formed on the back surface of the substrate 2. The dielectric layer 5*d* and the vias 5*c* are made of the same material as the dielectric plates 5.

In the micro lens array antenna 1F according to the sixth embodiment as described above, the dielectric lenses 4 can be easily attached to the substrate 2 to improve the assemblability thereof, and the unit cost of the dielectric lenses 4 can be reduced. Accordingly, the micro lens array antenna 1F can be provided at a low cost, as with the micro lens array antenna 1E described above.

It should be noted that, in the micro lens array antennas 1A to 1D and 1F described above, the dielectric plates 5 may have a larger dielectric constant than the dielectric lenses 4.

According to a modification of this structure, by setting the relative dielectric constant of the dielectric lens 4 to, for example, 2 to 3 and the relative dielectric constant of the dielectric plate 5 to, for example, 8 to 10 to ensure the propagation of the radio wave $\alpha 0$ emitted from the patch antenna 3*a* to the dielectric lens 4 disposed above the patch antenna 3*a* and by increasing the difference between the dielectric constant of the dielectric plate 5 and the dielectric constant of the space, it is possible to increase the amount of the first reflected radio wave $\alpha 1$, which is the radio wave $\alpha 0$ that has been emitted from the patch antenna 3*a* and has been reflected by the one side surface 5*a* of the dielectric plate 5. Accordingly, the thickness of the dielectric plate 5 provided on a portion of the substrate 2 between two of the dielectric lenses 4 can be reduced, and accordingly, the gap between the dielectric lenses 4 can be reduced, and the external dimensions of the micro lens array antennas 1A to 1D and 1F can be reduced.

In addition, in the micro lens array antennas 1A to 1F described above, the dielectric plates 5 may have a dielectric constant that also causes a predetermined dielectric loss that causes a portion of the electrical energy of the radio wave $\alpha 0$ emitted from the patch antennas 3*a* to be converted into thermal energy.

According to a modification of this structure, the electric energy of the radio wave $\alpha 0$ emitted at a low elevation angle from the patch antenna 3*a* is reduced by causing a dielectric loss in the dielectric plate 5. This suppresses the effect of the radio wave $\alpha 0$ emitted at a low elevation angle from the patch antenna 3*a* on the dielectric lens 4 provided above the adjacent patch antenna 3*a* and suppresses the effect of the reflected radio waves $\alpha 1$ and $\alpha 2$ reflected by the dielectric plate 5 on the dielectric lens 4 provided above the patch antenna 3*a* from which the radio wave $\alpha 0$ has been emitted. Accordingly, it is possible to provide the micro lens array antennas 1A to 1F that can more effectively prevent the antenna gain of the patch antennas 3*a* from decreasing and the sidelobe characteristics from degrading.

In addition, in the embodiments and modifications described above, the case in which the planar antennas are patch antennas has been described. However, the planar antennas are not limited to patch antennas and may be, for example, planar antennas, such as meander line antennas formed by bending a conducting wire into a crank shape, or slot antennas. In addition, the number of the planar antennas that constitute the planar array antenna 3 is not limited to the number of planar antennas in the embodiments and the modifications described above as long as the number is two or more.

INDUSTRIAL APPLICABILITY

The micro lens array antennas 1A to 1F described above or the micro lens array antennas 1A to 1F according to the modifications described above may be installed in a radar device, and the radar device may be installed in the vehicle 21, as with the radar device 22 illustrated in FIG. 4. In this structure, it is possible to provide a radar device and a vehicle that include the micro lens array antenna in which the antenna gain is less likely to be reduced and the sidelobe characteristics are less likely to degrade. In addition, the radar device can be installed in not only vehicles but also aircraft, ships, and the like. Even in this case, the same operation and effect as in vehicles are obtained.

REFERENCE SIGNS LIST

1A, 1B, 1C, 1D, 1E, 1F micro lens array antenna
2 substrate
3 planar array antenna
3*a* patch antenna (planar antenna)
4 dielectric lens
5 dielectric plate
5*a* one side surface
5*b* other side surface
5*c* via
5*d* dielectric layer
6 ground pattern
21 vehicle
22 radar device
c focal point

The invention claimed is:

1. A micro lens array antenna comprising:

a planar array antenna including a plurality of planar antennas formed on a substrate;

a plurality of dielectric lenses each provided above each of the plurality of planar antennas; and a plurality of dielectric plates each provided on part of the substrate, the part being provided between two adjacent dielectric lenses of the plurality of dielectric lenses, wherein each of the plurality of dielectric plates has a thickness and a dielectric constant at which a phase of a second reflected radio wave shifts from a phase of a first reflected radio wave by a predetermined phase, the first reflected radio wave being a radio wave that is emitted from each of the plurality of planar antennas and reflected by a first side surface of the dielectric plate facing the planar antenna of the plurality of planar antennas, the second reflected radio wave being a radio wave that passes through the first side surface, propagates through the dielectric plate, is reflected by a second side surface of the dielectric plate opposite to the first side surface, and appears in a space on a side of the first side surface of the dielectric plate.

2. The micro lens array antenna according to claim 1, wherein a plurality of planar array antennas are arranged in a plurality of rows that are adjacent to each other on the substrate, the planar array antenna being one of the plurality of planar array antennas, each of the plurality of dielectric lenses is formed in an elliptical shape having a major axis that is orthogonal to a direction in which the rows of the plurality of planar array antennas are arranged in plan view of a surface of the substrate, and each of the plurality of planar antennas are formed at a predetermined distance from a focal point of each of the plurality of dielectric lens on the substrate around the focal point in a direction of the major axis.

3. The micro lens array antenna according to claim 2, wherein each of the plurality of dielectric plates is provided between the adjacent planar antennas in each of the rows.

4. The micro lens array antenna according to claim 1, wherein the plurality of dielectric lenses are formed integrally with the plurality of dielectric plates and fixed onto the substrate.

5. The micro lens array antenna according to claim 1, wherein a dielectric constant of the plurality of dielectric plates is greater than a dielectric constant of the plurality of dielectric lenses.

6. The micro lens array antenna according to claim 1, wherein the plurality of dielectric plates have a dielectric constant causing a predetermined dielectric loss for converting a portion of electrical energy of a radio wave emitted from each of the plurality of planar antennas into thermal energy.

7. A radar device comprising:

a micro lens array antenna, wherein the micro lens array antenna includes a planar array antenna including a plurality of planar antennas formed on a substrate, a plurality of dielectric lenses each provided above each of the plurality of planar antennas, and a plurality of dielectric plates each provided on part of the substrate, the part being provided between two adjacent dielectric lenses of the plurality of dielectric lenses, wherein each of the plurality of dielectric plates has a thickness and a dielectric constant at which a phase of a second reflected radio wave shifts from a phase of a first reflected radio wave by a predetermined phase, the first reflected radio wave being a radio wave that is emitted from each of the plurality of planar antennas and reflected by a first side surface of the dielectric plate facing the planar antenna of the plurality of planar antennas, the second reflected radio wave being a radio wave that passes through the first side surface, propagates through the dielectric plate, is reflected by a second side surface of the dielectric plate opposite to the first side surface, and appears in a space on a side of the first side surface of the dielectric plate.

8. The radar device according to claim 7, wherein a plurality of planar array antennas are arranged in a plurality of rows that are adjacent to each other on the substrate, the planar array antenna being one of the plurality of planar array antennas, each of the plurality of dielectric lenses is formed in an elliptical shape having a major axis that is orthogonal to a direction in which the rows of the plurality of planar array antennas are arranged in plan view of a surface of the substrate, and each of the plurality of planar antennas are formed at a predetermined distance from a focal point of each of the plurality of dielectric lens on the substrate around the focal point in a direction of the major axis.

9. The radar device according to claim 8, wherein each of the plurality of dielectric plates is provided between the adjacent planar antennas in each of the rows.

10. The radar device according to claim 7, wherein the plurality of dielectric lenses are formed integrally with the plurality of dielectric plates and fixed onto the substrate.

11. A vehicle comprising:

a radar device that includes a micro lens array antenna, wherein the micro lens array antenna includes a planar array antenna including a plurality of planar antennas formed on a substrate, a plurality of dielectric lenses each provided above each of the plurality of planar antennas, and a plurality of dielectric plates each provided on part of the substrate, the part being provided between two adjacent dielectric lenses of the plurality of dielectric lenses, wherein each of the plurality of dielectric plates has a thickness and a dielectric constant at which a phase of a second reflected radio wave shifts from a phase of a first reflected radio wave by a predetermined phase, the first reflected radio wave being a radio wave that is emitted from each of the plurality of planar antennas and reflected by a first side surface of the dielectric plate facing the planar antenna of the plurality of planar antennas, the second reflected radio wave being a radio wave that passes through the first side surface, propagates through the dielectric plate, is reflected by a second side surface of the dielectric plate opposite to the first side surface, and appears in a space on a side of the first side surface of the dielectric plate.

12. The vehicle according to claim 11, wherein a plurality of planar array antennas are arranged in a plurality of rows that are adjacent to each other on the substrate, the planar array antenna being one of the plurality of planar array antennas, each of the plurality of dielectric lenses is formed in an elliptical shape having a major axis that is orthogonal to a direction in which the rows of the plurality of planar array antennas are arranged in plan view of a surface of the substrate, and each of the plurality of planar antennas are formed at a predetermined distance from a focal point of each of the plurality of dielectric lens on the substrate around the focal point in a direction of the major axis.

13. The vehicle according to claim 12, wherein each of the plurality of dielectric plates is provided between the adjacent planar antennas in each of the rows.

14. The vehicle according to claim 11, wherein the plurality of dielectric lenses are formed integrally with the plurality of dielectric plates and fixed onto the substrate.

* * * * *